G. SHOUP.
Churns.

No. 154,287.

Patented Aug. 18, 1874.

WITNESSES:
Francis McArdle
Sedgwick

INVENTOR:
G. Shoup
BY Munn & Co.
ATTORNEYS.

UNITED STATES PATENT OFFICE.

GEORGE SHOUP, OF WILLIAMSTOWN, MISSOURI.

IMPROVEMENT IN CHURNS.

Specification forming part of Letters Patent No. 154,287, dated August 18, 1874; application filed June 27, 1874.

*To all whom it may concern:*

Figure 1:
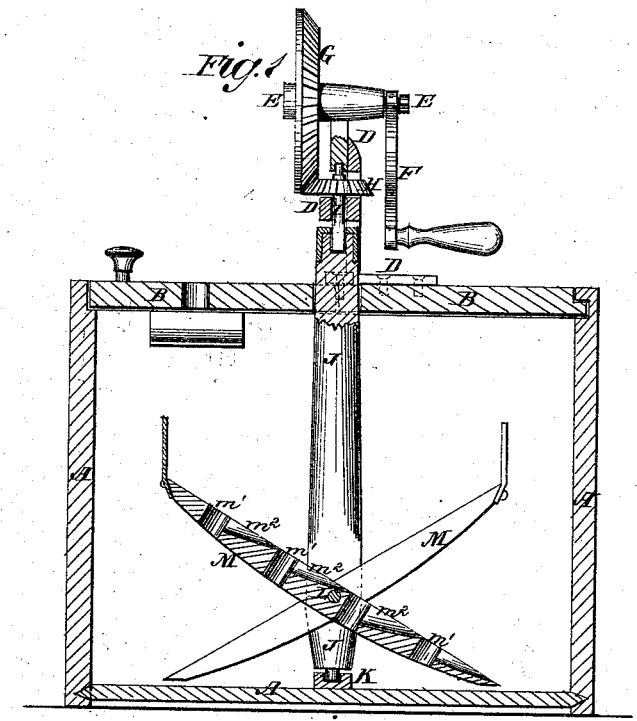
Figure 2:
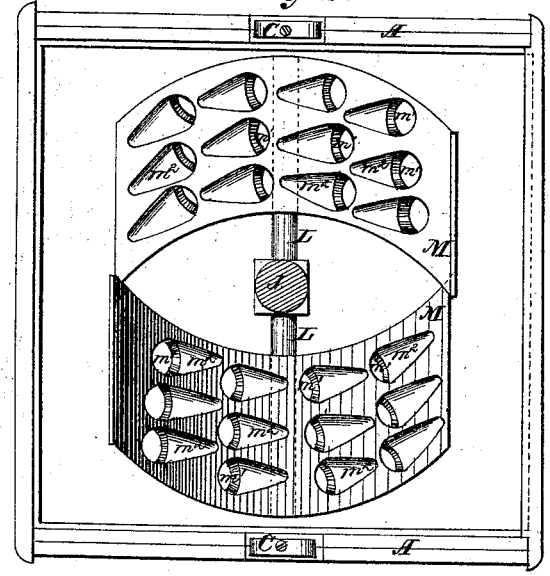

Be it known that I, GEORGE SHOUP, of Williamstown, in the county of Lewis and State of Missouri, have invented a new and useful Improvement in Churns, of which the following is a specification:

Figure 1 is a vertical section of my improved churn. Fig. 2 is a top view of the same, the cover and its attachments being removed.

Similar letters of reference indicate corresponding parts.

My invention has for its object to furnish an improved churn, simple in construction, convenient in use, and effective in operation, bringing the butter quickly, and developing all the butter there may be in the milk.

The invention consists in the inclined plates, made convex upon their outer edges, concave upon their inner edges, and provided with holes and channels, in combination with a cross-bar attached to the lower part of a dasher-shaft, and in the combination of the upright flanges or plates with the upper ends of the inclined perforated plates, as hereinafter fully described.

A is the box or body of the churn, which is made rectangular in form, and is provided with a closely-fitting cover, B. The cover B is made in two equal parts, and fits into and rests in a rabbet formed in the upper edge of the box A, except that the outer side edge of the part of the cover, to which the mechanism is attached, has a tongue formed upon it to enter a groove in the side of the said box. The cover B is secured in place by buttons C, which are pivoted to the edge of the box A. To the upper side of one part of the cover B is attached a bracket, D, in bearings in the upper part of which revolves a shaft, E. To the outer end of the shaft E is attached the crank F, by which the churn is operated; and to its inner end is attached a large gear-wheel, G, the teeth of which mesh into the teeth of the small bevel-gear wheel H, attached to a short vertical shaft, I, which revolves in bearings in the middle part of the bracket D, and the lower end of which is squared off to enter a square hole or socket formed in the upper end of the dasher-shaft J. The upper part of the dasher-shaft J passes through and revolves in a hole in the cover B, made by forming semicircular notches in the adjacent edges of the two parts of the said cover. The lower end of the dasher-shaft J revolves in or is pivoted to a socket or step, K, at the center of the bottom of the box A. To the lower part of the dasher-shaft J is attached a cross-bar, L, to the arms of which are attached the two plates M at an angle of about forty-five degrees, (45°.) The outer edges of the plates M are made convex, as shown in Fig. 2, so as, when the shaft J is revolved, to sweep around close to the sides of the box A, and their inner edges are made concave, so as to leave an open space around the shaft J. The ends of the plates M are made straight, and parallel with the cross-bar L, and their lower ends are beveled off upon their lower edges, so as to work close to the bottom of the box A. To the upper ends of the plates M are attached plates or flanges N, which project upward vertically, or nearly so. Through the plates M are formed a number of holes, $m^1$, at right angles with the plane of said plates. In the upper side of the plates M, at the lower side of the holes $m^1$, are formed inclined tapering and rounded channels $m^2$, as shown in Figs. 1 and 2, to facilitate the passage of the milk through the said holes $m^1$.

In using the churn, the plates M are carried around, the lower end forward, which causes the milk to pass up the plates M to the plates or flanges N, by which it is projected against the cover and sides of the churn, and thrown into violent agitation.

A portion of the milk that falls back, and a part of that that is passing up the plates M, pass through the holes in the said plates into the space behind them.

When in operation the milk is carried outward, so as to leave a clear space around the shaft J down to the bottom of the churn, through which space the milk raised by the plates M passes back to the bottom of the said churn, to be again raised by said plates.

Having thus described my invention, I claim as new and desire to secure by Letters Patent—

1. The inclined plates M, made convex upon their outer edges, concave upon their inner edges, and provided with holes $m^1$ and channels $m^2$, in combination with a cross-bar, L, attached to the lower part of a dasher-shaft, J, substantially as herein shown and described.

2. The combination of the upright flanges or plates N with the upper ends of the inclined perforated plates M, substantially as herein shown and described.

GEORGE SHOUP.

Witnesses:
R. C. MUMMA,
JOHN FORD, M. D.